(12) United States Patent
Aigner et al.

(10) Patent No.: US 12,553,573 B2
(45) Date of Patent: Feb. 17, 2026

(54) STORAGE TANK

(71) Applicant: LINDE GMBH, Pullach (DE)

(72) Inventors: Herbert Aigner, Reut-Taubenbach (DE); Manfred Schönberger, Tacherting (DE)

(73) Assignee: Linde GmbH, Pullach (DE)

( * ) Notice: Subject to any disclaimer, the term of this patent is extended or adjusted under 35 U.S.C. 154(b) by 662 days.

(21) Appl. No.: 17/995,210

(22) PCT Filed: Mar. 22, 2021

(86) PCT No.: PCT/EP2021/025113
§ 371 (c)(1),
(2) Date: Sep. 30, 2022

(87) PCT Pub. No.: WO2021/204419
PCT Pub. Date: Oct. 14, 2021

(65) Prior Publication Data
US 2023/0243470 A1    Aug. 3, 2023

(30) Foreign Application Priority Data

Apr. 6, 2020 (EP) ..................................... 20020156

(51) Int. Cl.
*F17C 3/04* (2006.01)
*F17C 3/02* (2006.01)

(52) U.S. Cl.
CPC ................ *F17C 3/025* (2013.01); *F17C 3/04* (2013.01); *F17C 2201/0166* (2013.01);
(Continued)

(58) Field of Classification Search
CPC .... F17C 3/025; F17C 3/04; F17C 2201/0166; F17C 2201/032; F17C 2203/015;
(Continued)

(56) References Cited

U.S. PATENT DOCUMENTS 1,478,479 A  *  12/1923  Lachmann .............. F17C 13/04
                                                   220/592.27
2,525,807 A  *  10/1950  Lane ....................... F17C 13/02
                                                   73/299
(Continued)

FOREIGN PATENT DOCUMENTS

CA    2570766 A1    1/2006
GB    2119843 A    11/1983
(Continued)

OTHER PUBLICATIONS

SU-966395-A text from PE2E Search (Year: 1982).*
(Continued)

*Primary Examiner* — S. Joseph Morano
*Assistant Examiner* — Eric Anthony Starck
(74) *Attorney, Agent, or Firm* — Millen, White, Zelano & Branigan, P.C.; Brion P. Heaney

(57) ABSTRACT

The present invention relates to a storage tank for liquid hydrogen, comprising a wall, a base, which closes the wall at the end face on one side, a top, which closes the wall at the end face on the side facing away from the base, and an intermediate wall, which is arranged inside of the wall and at a distance therefrom, wherein a gap is provided between a lower edge of the intermediate wall and the base, so that an interior enclosed by the intermediate wall is fluidically connected to an interior enclosed by the wall.

15 Claims, 3 Drawing Sheets

(52) U.S. Cl.
CPC .. *F17C 2201/032* (2013.01); *F17C 2203/015* (2013.01); *F17C 2203/0629* (2013.01); *F17C 2221/012* (2013.01); *F17C 2223/0161* (2013.01); *F17C 2260/016* (2013.01); *F17C 2270/0105* (2013.01)

(58) Field of Classification Search
CPC ........ F17C 2203/0629; F17C 2221/012; F17C 2223/0161; F17C 2260/016; F17C 2270/0105; F17C 2201/054; F17C 2203/018; F17C 2203/0304; F17C 2203/0636; F17C 2223/033; Y02E 60/32; E04H 7/04; B63H 21/38
USPC ........................................................ 114/74 R
See application file for complete search history.

(56) References Cited

U.S. PATENT DOCUMENTS

| | | | | |
|---|---|---|---|---|
| 3,830,180 | A | * | 8/1974 | Bolton .................... B63B 25/16 |
| | | | | 114/74 A |
| 3,880,193 | A | * | 4/1975 | Lewis .................... F16L 55/045 |
| | | | | 62/50.7 |
| 4,129,146 | A | * | 12/1978 | Schuler .................... F17C 5/02 |
| | | | | 62/48.1 |
| 4,483,454 | A | * | 11/1984 | Rogers .................... B65D 90/52 |
| | | | | 220/563 |
| 4,750,631 | A | * | 6/1988 | Hastings ................ F17C 13/123 |
| | | | | 220/88.1 |
| 4,875,313 | A | | 10/1989 | Sato |
| 2016/0305610 | A1 | * | 10/2016 | Karng ........................ F17C 3/08 |

FOREIGN PATENT DOCUMENTS

| | | |
|---|---|---|
| JP | S5491814 A | 7/1979 |
| JP | S56124799 A | 9/1981 |
| JP | H02242778 A | 9/1990 |
| JP | 2007308156 A | 11/2007 |
| KR | 101955626 B1 | 5/2019 |
| SU | 966395 A * | 10/1982 |
| WO | 2008036991 A1 | 4/2008 |
| WO | 2017190846 A1 | 11/2017 |

OTHER PUBLICATIONS

SU-966395-A1 Machine Translation (Google) (Year: 1982).*
Japan Patent Office Office Action dated Apr. 30, 2025 issued in corresponding application 2022-558246.
European Patent Office Office Action dated Jun. 19, 2024 issued in corresponding application 21715482.2.

* cited by examiner

STORAGE TANK

The invention relates to a storage tank for liquid hydrogen.

According to the applicant's internal findings, storage tanks for liquid hydrogen have a cylindrical geometry with a tubular base section along with two domed end-cap sections, which close the base section at the end faces. In maritime applications of such storage tanks, movement of the liquid hydrogen caused by swell must be expected in the storage tank. In the event that the storage tank is arranged lying or vertically, the mass inertia of the liquid hydrogen and the existing curvature of the storage tank, both on its base section and on the end-cap sections, can result in the sloshing of the liquid hydrogen in a large area. This sloshing, also known as swashing, can lead to the cooling of a gas phase of the hydrogen present in the storage tank and thus to a pressure reduction in a gas cushion created by the gas phase. Depending on the current swell, this can have undesirable effects on a hydrogen supply pressure available for operating components, for example a fuel cell. This can lead to an unstable operation of the operating components. This must be prevented.

Against this background, the object of the present invention is to provide an improved storage tank.

Accordingly, a storage tank for liquid hydrogen is proposed. The storage tank comprises a wall, a base, which closes the wall at one end face, a top that closes the wall at one end facing away from the base, and an intermediate wall arranged inside the wall and at a distance therefrom, wherein a gap is provided between a lower edge of the intermediate wall and the base, so that an interior space enclosed by the intermediate wall is in fluidic connection with an interior space enclosed by the wall.

Due to the fact that the storage tank can be arranged vertically and has the additional intermediate wall, a significant reduction of the sloshing effect can be achieved in comparison to horizontal storage tanks but also in comparison with vertically arranged storage tanks with no such an intermediate wall, since the movement of the liquid hydrogen acts identically in all spatial directions and does not have to be considered with regard to longitudinal and transverse movements.

The storage tank is particularly suitable for maritime applications. The storage tank can therefore be referred to as a maritime storage tank. For example, the storage tank can be mounted on a vehicle, in particular on a vessel. Accordingly, a vehicle, in particular a vessel, with such a storage tank is also proposed. The storage tank can also be referred to as a hydrogen storage tank. The storage tank is preferably suitable for holding liquid hydrogen. However, the storage tank can also be used for other cryogenic liquids. Examples of cryogenic fluids or liquids, or cryogens for short, are, for example, liquid helium, liquid nitrogen or liquid oxygen.

In the storage tank, after or during the filling of the hydrogen, a gas zone with gaseous hydrogen forms and an underlying liquid zone with liquid hydrogen. A phase boundary is provided between the gas zone and the liquid zone. After entering the storage tank, the helium thus has two phases with different aggregate states, namely, liquid and gaseous. The hydrogen can transition from the liquid phase into the gaseous phase and vice versa. The intermediate wall projects at least partially into the liquid zone. The intermediate wall is preferably always at least partially washed over with liquid hydrogen.

The wall is in particular cylindrical, preferably circular-cylindrical. The intermediate wall also has a circular-cylindrical geometry. The fact that the intermediate wall is "spaced apart" from the wall means in the present case that no direct contact is provided between the wall and the intermediate wall. In particular, the intermediate wall is placed at a radial distance from the wall. The intermediate wall is open at its end face in particular when viewed in the direction of the base. This means that the term "enclosed" also comprises embodiments in which the respective interior space is open towards the other interior space. The fact that the interior spaces are in "fluidic connection" means in the present case that the liquid hydrogen can flow back and forth between the interior spaces. As regards a direction of gravity, the top is placed in particular above the base. That is to say, the storage tank is placed upright or vertically.

According to a particularly preferred development of the storage tank, said storage tank comprises an axis of symmetry running along a direction of gravity, a wall that is rotationally symmetrical with respect to the axis of symmetry, a base that closes off the wall on one side at the end face, a top that closes the wall at one end face facing away from the base, and a intermediate wall that is arranged inside the wall and is arranged at a distance from said wall and is rotationally symmetrical with respect to the axis of symmetry.

The fact that the axis of symmetry extends along the direction of gravity in the present case means that the axis of symmetry and thus also the storage tank are arranged vertically and not horizontally. That is to say, the top is located at the top with respect to the direction of gravity and the base is located at the bottom and thus below the top. The wall connects the top to the base. The top and the base are domed in particular outwards in relation to the wall.

According to one embodiment, the wall is rotationally symmetrical with respect to an axis of symmetry extending along a direction of gravity.

The wall is thus preferably tubular or cylindrical.

According to a further embodiment, the intermediate wall is rotationally symmetrical in relation to the axis of symmetry.

The intermediate wall thus runs around the axis of symmetry at a radial distance from the wall.

According to another embodiment, a gap running around the axis of symmetry is provided between the wall and the intermediate wall.

The gap is preferably annular. The gap runs completely around the axis of symmetry. The gap is preferably gas-filled. The gap can also be at least partially liquid-filled. That is to say, the gap can at least be partially filled with liquid hydrogen and at least partially with gaseous hydrogen.

According to a further embodiment, the storage tank comprises a plurality of intermediate walls that are rotationally symmetrical in relation to the axis of symmetry, wherein the intermediate walls are arranged coaxially with one another.

The number of the intermediate walls is arbitrary. For example, two, three or more intermediate walls are provided. The intermediate walls are preferably all cylindrical and have a rotationally symmetrical structure in relation to the common axis of symmetry. Here, "coaxial" means in particular that the intermediate walls have the common axis of symmetry.

According to a further embodiment, a gap running around the axis of symmetry is provided between a first intermediate wall and a second intermediate wall arranged within the first intermediate wall.

The gap is preferably annular. The gap is in particular gas-filled. The gap can also be at least partially liquid-filled.

A third intermediate wall and a fourth intermediate wall with corresponding gaps can also be provided.

According to a further embodiment, the intermediate wall is supported on the wall by means of supports.

The supports can be designed in the manner of struts and connect the intermediate wall to the wall of the storage tank. The second intermediate wall can likewise be supported directly on the wall, or the second intermediate wall is supported on the first intermediate wall. The number of supports is arbitrary. At least three supports, which are evenly distributed around the axis of symmetry, are preferably provided.

According to a further embodiment, the intermediate wall, viewed along the axis of symmetry, is arranged at a distance from the base with a gap.

This means that the intermediate wall is not connected to the base. The intermediate wall has in particular a lower edge that projects into the liquid hydrogen. In particular, the lower edge is arranged at a distance from the base by the gap.

According to a further embodiment, the intermediate wall is connected to the top.

The storage tank preferably comprises an outer tank and an inner tank accommodated in the outer tank. The intermediate wall is in particular fixedly connected, for example welded or soldered thereto, to a top section of the inner tank.

According to a further embodiment, the storage tank further comprises an inner tank for holding the hydrogen and an outer tank in which the inner tank is accommodated, wherein the intermediate wall, starting from the top and extending in the direction of the base, runs into the inner tank along the axis of symmetry.

An insulating element can be provided between the inner tank and the outer tank. The inner tank and the outer tank each have a tubular base section that is rotationally symmetrical in relation to the axis of symmetry. The respective base section is connected at one end to a top section and is connected to a bottom section at an end facing away from the top section. The respective top sections form the top of the storage tank, the respective bottom sections form the base of the storage tank. The base sections form the wall of the storage tank.

According to a further embodiment, the intermediate wall extends into the inner tank at least along one half of a length of the inner tank.

This means that the intermediate wall has a length along the axis of symmetry that is at least equal to half the length of the inner tank or longer than this. However, the previously mentioned gap is still provided between the lower edge of the intermediate wall and the base of the storage tank.

According to a further embodiment, the base and the top are in relation to the wall domed outwards and in opposite directions.

That is to say, the base and the top are curved away from the wall along the axis of symmetry. As previously mentioned, the base comprises the bottom sections of the inner tank and of the outer tank, and the top comprises the top sections of the inner tank and of the outer tank.

In the present case, "a(n)" is not necessarily to be understood as limiting to exactly one element. It is rather the case that several elements, such as two, three, or more, may also be provided. Any other numerical word used herein is also not to be understood as meaning that an exact limitation to exactly the corresponding number of elements must be realized. Rather, numerical differences upward or downward are possible.

Further possible implementations of the storage tank also include not explicitly mentioned combinations of features or embodiments described above or below with respect to the exemplary embodiments. A person skilled in the art will also add individual aspects as improvements or additions to the respective basic form of the storage tank.

Further advantageous embodiments of the storage tank are the subject-matter of the dependent claims and of the exemplary embodiments of the storage tank described below. The storage tank is explained below in more detail on the basis of preferred embodiments while making reference to the provided figures.

In the figures, the same or functionally equivalent elements have been provided with the same reference signs unless otherwise indicated.

Figure 1:
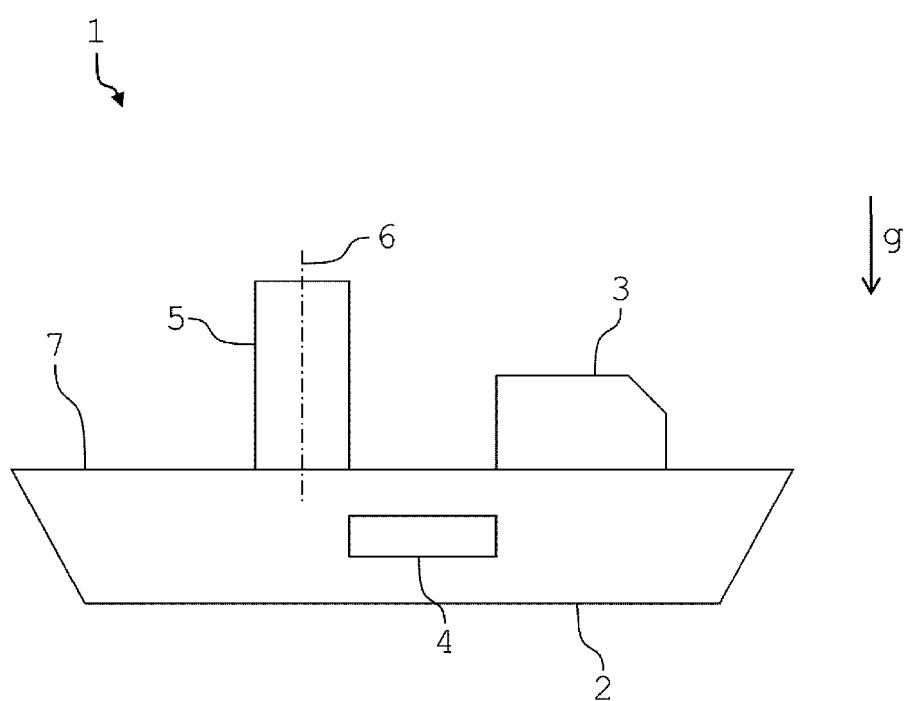
FIG. 1 shows a schematic side view of an embodiment of a vehicle.

FIG. 1 shows a highly simplified schematic side view of an embodiment of a vehicle 1. The vehicle 1 can be, for example, a maritime vessel, in particular a ship. The vehicle 1 can be referred to as a maritime vehicle. In particular, the vehicle 1 can be a maritime passenger ferry. Alternatively, the vehicle 1 can also be a land vehicle. However, it is assumed below that the vehicle 1 is a vessel.

The vehicle 1 comprises a hull 2 that is buoyant. A bridge 3 is provided at or on the hull 2. The vehicle 1 is preferably powered by hydrogen. For this purpose, the vehicle 1 can have a fuel cell 4. In the present case, a "fuel cell" is understood to mean a galvanic cell that converts into electrical energy the chemical reaction energy of a continuously supplied fuel, in the present case hydrogen, and of an oxidant, in the present case oxygen. By means of the electrical energy obtained, an electric motor (not shown) can be powered, for example, which in turn drives a ship's screw for propelling the vehicle 1.

A storage tank 5 for storing liquid hydrogen is provided for supplying the fuel cell 4 with hydrogen. The storage tank 5 is rotationally symmetrical with respect to a center axis or axis of symmetry 6. The storage tank 5 can be arranged, for example, inside the hull 2, in particular within an engine room, on the bridge 3 or on a deck of the hull 2, said deck acting as a foundation 7. The axis of symmetry 6 is oriented along a direction of gravity g. That is to say, the storage tank 5 is positioned upright or vertically. The axis of symmetry 6 is thus perpendicular to the foundation 7. In the event that the vehicle 1 is, for example, a vehicle that has been converted to a hydrogen drive, the storage tank 5 can also be placed, for example, in a funnel or a stack of the vehicle 1.

In maritime applications, movement of the liquid hydrogen contained in the storage tank 5 caused by swell must be expected. In the case of a horizontally arranged cylindrical storage tank (not shown), a large-area sloshing of the liquid hydrogen is favored by the mass inertia of the liquid hydrogen and the curvature, present due to the horizontal installation, of the storage tank, both at its cylindrical outer wall and at its ends.

This sloshing, also known as swashing, leads to cooling of the gas phase above the liquid hydrogen and thereby to pressure reduction of a gas cushion formed above the liquid hydrogen. Depending on the current swell, this can have undesirable effects on a hydrogen supply pressure available for operating components of the fuel cell 4, which can lead to an unstable operation of the fuel cell 4. This must be prevented.

Figure 2:
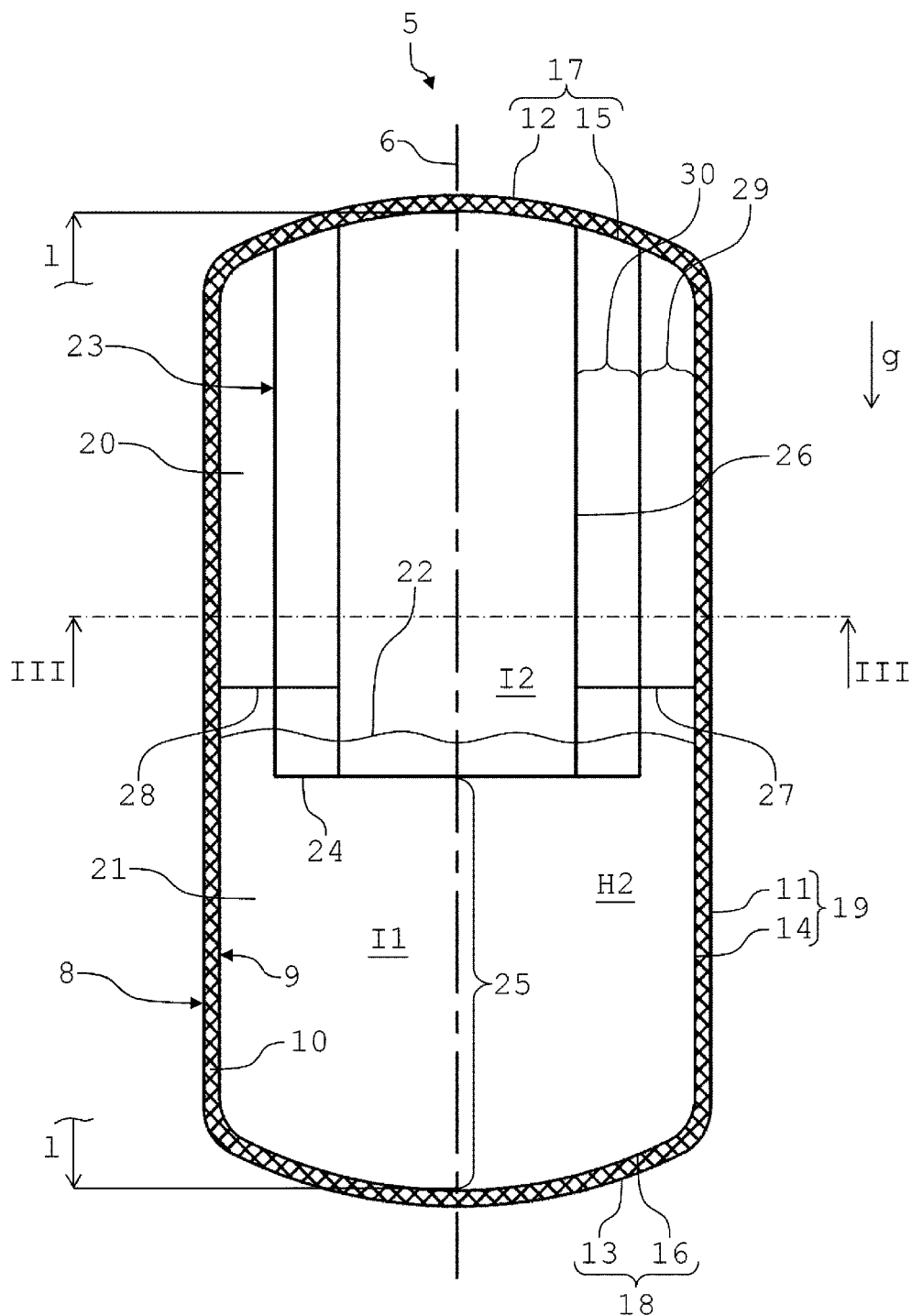
FIG. 2 shows a schematic sectional view of an embodiment of a storage tank for the vehicle according to FIG. 1.
Figure 3:
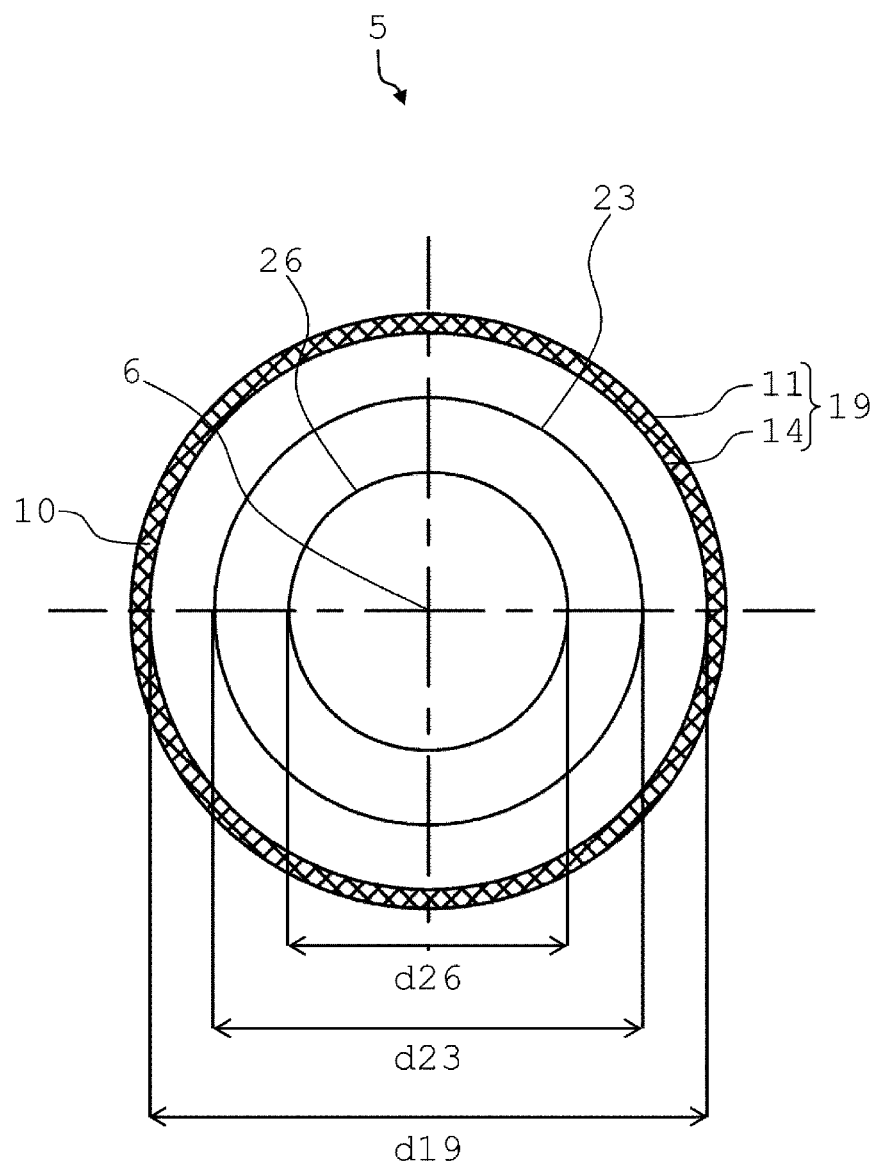
FIG. 3 shows a further schematic sectional view of the storage tank according to the section line III-Ill in FIG. 2.

FIG. 2 shows a schematic sectional view of an embodiment of a storage tank 5 as mentioned above. FIG. 3 shows a further sectional view of the storage tank 5 according to the section line III-III of FIG. 2. In the following, reference is made simultaneously to FIGS. 2 and 3.

The storage tank 5 can also be referred to as a storage container. As mentioned above, the storage tank 5 is suitable for holding liquid hydrogen H2 (boiling point at 1 bara: 20.268 K=−252.882° C.). The storage tank 5 can therefore also be referred to as a hydrogen storage tank. However, the storage tank 5 can also be used for other cryogenic liquids. Examples of cryogenic fluids or liquids, or cryogens for short, are, in addition to the aforementioned liquid hydrogen H2, liquid helium He (boiling point at 1 bara: 4.222 K=−268.928° C.), liquid nitrogen N2 (boiling point at 1 bara: 77.35 K=−195.80° C.) or liquid oxygen O2 (boiling point at 1 bara: 90.18 K=−182.97° C.).

The storage tank 5 is rotationally symmetrical in relation to axis of symmetry 6. The storage tank 5 comprises an outer tank 8 that is rotationally symmetrical in relation to the axis of symmetry 6 and an inner tank 9 that is rotationally symmetrical in relation to the axis of symmetry 6. The inner tank 9 is arranged completely inside the outer tank 8. An insulating element 10 is provided between the outer tank 8 and the inner tank 9. The insulating element 10 can comprise a multi-layer insulation (MLI) or can be designed as such.

The outer tank 8 comprises a tubular or cylindrical base section 11 that can have a rotationally symmetrical design in relation to the axis of symmetry 6. The base section 11 is closed at both end faces with the aid of a top section 12 and a bottom section 13. In the orientation in FIG. 2 or viewed along the direction of gravity g, the top section 12 is arranged above the bottom section 13. In cross-section the base section 11 can have a circular or approximately circular geometry. The top section 12 and the bottom section 13 are domed. The top section 12 and the bottom section 13 are domed in opposite directions, so that the top section 12 and the bottom section 13 are curved outwards with respect to the base section 11. The outer tank 8 is fluid-tight, in particular gas-tight.

The inner tank 9, like the outer tank 8, comprises a tubular or cylindrical base section 14 that is rotationally symmetrical in relation to the axis of symmetry 6. In the orientation in FIG. 2, the base section 14 is closed at the top end by a top section 15 and at the bottom end by a bottom section 16. In cross-section, the base section 14 can have a circular or approximately circular geometry. The top section 15 and the bottom section 16 are domed. In particular, the top section 15 and the bottom section 16 are domed in opposite directions, so that the top section 15 and the bottom section 16 are domed outwards in relation to the base section 14. The outer tank 9 is fluid-tight, in particular gas-tight. The outer tank 8 and/or the inner tank 9 can have a blow-off valve (not shown).

The two top sections 12, 15 together with the insulating element 10 lying between them form a top 17 of the storage tank 5. The two bottom sections 13, 16 together with the insulating element 10 lying between them form a base 18 of the storage tank 5, and the two base sections 11, 14 together with the insulating element 10 lying between them form a wall 19 of the storage tank 5 that extends rotationally symmetrically about the axis of symmetry 6. The wall 19 encloses an interior space I1 of the storage tank 5.

The liquid hydrogen H2 is held in the inner tank 9 or in the interior space I1. As long as the hydrogen H2 is in the two-phase region, a gas zone 20 with vaporized hydrogen H2 and a liquid zone 21 with liquid hydrogen H2 can be provided in the inner tank 9. After entering the inner tank 9, the hydrogen H2 thus has two phases with different aggregate states, namely, liquid and gaseous. That is to say, in the inner tank 9 there is a phase boundary 22 between the liquid hydrogen H2 and the gaseous hydrogen H2.

The storage tank 5 also has at least one intermediate wall 23 within the inner tank 9. The intermediate wall 23 has a cylindrical, in particular circular-cylindrical, geometry and is rotationally symmetrical in relation to the axis of symmetry 6. In this case, the intermediate wall 23 is connected to the top 17 of the storage tank 5, in particular to the top section 15 of the inner tank 9. For example, the intermediate wall 23 can be welded or soldered to the top section 15. The intermediate wall 23 encloses an interior space I2, which is in fluidic connection with the interior space I1. The interior space I2 is not closed, but is open in the direction of the base 18. The interior spaces I1, I2 are thus in fluidic connection with one another.

The intermediate wall 23 is constructed in particular concentrically in relation to the wall 19 or to the base sections 11, 14 of the outer tank 8 and of the inner tank 9. The intermediate wall 23 extends from the top 17 along the direction of gravity g in the direction of the base 18. However, no connection is provided between the base 18 and the intermediate wall 23. In particular, a gap 25 is provided between a lower edge 24 of the intermediate wall 23 and the base 18. The intermediate wall 23 runs along the axis of symmetry 6 into the inner tank 9 for at least over half of a length l of the inner tank 9. In this case, the intermediate wall 23 projects at least partially into the liquid zone 21. That is to say, the intermediate wall 23 is washed over in sections by liquid hydrogen H2.

A plurality of such intermediate walls 23 can be provided. For example, a first intermediate wall 23 and a second intermediate wall 26 are provided. The second intermediate wall 26 is likewise cylindrical and rotationally symmetrical in relation to the axis of symmetry 6. The second intermediate wall 26 is arranged within the first intermediate wall 23. That is to say, the second intermediate wall 26, the first intermediate wall 23 and the wall 19 are arranged concentrically. The second intermediate wall 26 also ends at the lower edge 24.

The first intermediate wall 23 and/or the second intermediate wall 26 can be supported with the aid of supports 27, 28 relative to the wall 19 or to the base section 14 of the inner tank 9. The number of supports 27, 28 is arbitrary. For example, three such supports 27, 28 are provided, which are evenly distributed around the axis of symmetry 6.

A gap 29 that runs around the axis of symmetry 6 is provided between the wall 19 and the first intermediate wall 23. The gap 29 can be partially filled with liquid and partially with gaseous hydrogen H2. A gap 30 that runs the axis of symmetry 6 is provided between the first intermediate wall 23 and the second intermediate wall 26. The gap 30 can also be partially filled with liquid and partially with gaseous hydrogen H2.

As FIG. 3 shows, the second intermediate wall 26 has a diameter d26 that is smaller than a diameter d23 of the first intermediate wall 23. The diameter d23 in turn is smaller than a diameter d19, in particular an inner diameter, of the wall 19 or of the base section 14 of the inner tank 9.

The function of the storage tank 5 is explained below. Due to the vertical structure or the vertical arrangement of the storage tank 5 alone, the previously mentioned sloshing effect is already reduced, since the movement of the liquid hydrogen H2 excited by the swell is significantly reduced by the vertical installation and this only impacts the vertically arranged wall 19. By installing the first intermediate wall 23 or the intermediate walls 23, 26, the sloshing of the liquid hydrogen H2 in the storage tank 5 is further reduced. The installation of the intermediate walls 23, 26 in the vertically arranged storage tank 5 can be realized with little effort, since the movement of the liquid hydrogen H acts identically in all directions and no longitudinal and transverse movements of the liquid hydrogen H2 have to be considered.

Although the present invention has been described with reference to exemplary embodiments, it can be modified in many ways within the scope of the claims.

REFERENCE SIGNS USED

1 Vehicle
2 Hull
3 Bridge
4 Fuel cell
5 Storage tank
6 Axis of symmetry
7 Foundation
8 Outer tank
9 Inner tank
10 Insulating element
11 Base section
12 Top section
13 Bottom section
14 Base section
15 Top section
16 Bottom section
17 Top
18 Base
19 Wall
20 Gas zone
21 Liquid zone
22 Phase boundary
23 Intermediate wall
24 Lower edge
25 Gap
26 Intermediate wall
27 Support
28 Support
29 Gap
30 Gap
d19 Diameter
d23 Diameter
d26 Diameter
g Direction of gravity
I1 Interior space
I2 Interior space
H2 Hydrogen
l Length

The invention claimed is:

1. A storage tank for liquid hydrogen, comprising: a cylindrical wall which is constructed rotationally symmetrically to an axis of symmetry and which has a first end face and a second end face, a base, which closes the cylindrical wall at the first end face, a top that closes the cylindrical wall at the second face, the second end face facing away from the base, and a first intermediate wall is arranged inside the cylindrical wall and spaced apart therefrom, wherein a first gap is provided between a lower edge of the first intermediate wall and the base, such that a first interior space enclosed by the first intermediate wall is in fluidic communication with a second interior space enclosed by the cylindrical wall so that liquid hydrogen can flow back and forth between the first and second interior spaces, and a second gap extending about the axis of symmetry is provided between the cylindrical wall and the first intermediate wall, wherein the storage tank further comprises a second intermediate wall arranged within the first intermediate wall, a third gap, running around the axis of symmetry of the storage tank, is provided between the first intermediate wall and the second intermediate wall, and a further gap is provided between a lower edge of the second intermediate wall and the base, such that a third interior space enclosed by the second intermediate wall is in fluidic communication with the first interior space enclosed by the first intermediate and with the second interior space enclosed by the cylindrical wall, wherein the first intermediate wall and the second intermediate wall each have a length that extends into the storage tank at least equal to one half the length of the storage tank, and wherein the first intermediate wall and the second intermediate wall are adapted to reduce sloshing of liquid hydrogen within the storage tank.

2. The storage tank according to claim 1, wherein the axis of symmetry runs along a direction of gravity.

3. The storage tank according to claim 2, wherein the first and second intermediate walls are arranged coaxially with one another.

4. The storage tank according to claim 1, wherein the first intermediate wall is supported on the wall one or more supports.

5. The storage tank according to claim 1, wherein the first intermediate wall is connected to the top.

6. The storage tank according to claim 2, further comprising an inner tank for holding liquid hydrogen and an outer tank in which the inner tank is accommodated, wherein the first and second intermediate walls start from the top and extends in the direction of the base into the inner tank along the axis of symmetry.

7. The storage tank according to claim 1, wherein the base and the top are domed outward and in opposite directions in relation to the cylindrical wall.

8. The storage tank according to claim 1, wherein the second intermediate wall is supported on the cylindrical wall by one or more supports.

9. The storage tank according to claim 1, wherein the second intermediate wall is connected to the top.

10. The storage tank according to claim 4, wherein the second intermediate wall is supported on the cylindrical wall by one or more supports.

11. The storage tank according to claim 5, wherein the second intermediate wall is connected to the top.

12. The storage tank according to claim 1, wherein the second intermediate wall extends into the storage tank to the lower edge of the first intermediate wall.

13. The storage tank according to claim 1, wherein the second intermediate wall is supported on the first intermediate wall by one or more supports.

14. The storage tank according to claim 4, wherein the second intermediate wall is supported on the first intermediate wall by one or more supports.

15. The storage tank according to claim 1, wherein the first intermediate wall is supported on the cylindrical wall by a plurality of supports, and the second intermediate wall is supported on the first intermediate wall by a plurality of supports.

\* \* \* \* \*